(12) United States Patent
Yamada

(10) Patent No.: US 8,102,384 B2
(45) Date of Patent: *Jan. 24, 2012

(54) INTERFACE DEVICE

(75) Inventor: Hajime Yamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 11/989,581

(22) PCT Filed: Jul. 25, 2006

(86) PCT No.: PCT/JP2006/314645
§ 371 (c)(1),
(2), (4) Date: Nov. 4, 2009

(87) PCT Pub. No.: WO2007/013440
PCT Pub. Date: Feb. 1, 2007

(65) Prior Publication Data
US 2010/0147663 A1   Jun. 17, 2010

(30) Foreign Application Priority Data

Jul. 29, 2005  (JP) ................................. 2005-220640

(51) Int. Cl.
*G06F 3/033* (2006.01)
*G09G 5/00* (2006.01)
(52) U.S. Cl. ........................................ 345/184; 345/156
(58) Field of Classification Search .......... 345/156–158, 345/164–169, 184; 348/734; 200/5 A, 5 R, 200/6 A, 6 R; 307/9.1; 701/1, 36; 463/37–38
See application file for complete search history.

(56) References Cited

U.S. PATENT DOCUMENTS

| 4,975,547 | A | * | 12/1990 | Nakayama et al. | 200/5 R |
|---|---|---|---|---|---|
| 5,945,646 | A | * | 8/1999 | Miller et al. | 200/5 R |
| 6,084,575 | A | * | 7/2000 | Oktay | 345/167 |
| 6,227,066 | B1 | | 5/2001 | Stachniak | |
| 6,348,912 | B1 | * | 2/2002 | Smith | 345/163 |
| 6,366,442 | B1 | * | 4/2002 | Onodera | 361/179 |
| 6,410,866 | B1 | * | 6/2002 | Klein et al. | 200/5 R |

(Continued)

FOREIGN PATENT DOCUMENTS

DE        4120975    *   1/1993
(Continued)

*Primary Examiner* — Ricardo L Osorio
(74) *Attorney, Agent, or Firm* — Birch, Stewart, Kolasch & Birch, LLP

(57) ABSTRACT

An interface device (15) is provided that includes an operating knob (30) for outputting an operation command signal to in-vehicle equipment, the operating knob (30) being provided with a palm rest portion (30a) for an occupant's palm to be placed on, and a switch (31) being disposed on the operating knob (30) within a region that a fingertip can reach while the palm is placed on the palm rest portion (30a). Since this determines the positional relationship between the switch (31) and the fingertip when the palm is placed on the palm rest portion (30a), even if the switch (31) is operated without being visually checked it is possible to prevent an erroneous operation from occurring and, moreover, the operability is remarkably improved. Furthermore, since tilting the operating knob (30), which is supported so that it can tilt in fore-and-aft and left-and-right directions, outputs an operation command signal to in-vehicle equipment, coupling this with operation of the switch (31) enables many types of operation command signal to be outputted.

17 Claims, 16 Drawing Sheets

U.S. PATENT DOCUMENTS

| | | |
|---|---|---|
| 6,429,849 B1 | 8/2002 | An et al. |
| 6,489,946 B1 * | 12/2002 | Takeda et al. ............... 345/161 |
| 6,636,200 B2 * | 10/2003 | Kataoka et al. ............... 345/161 |
| 7,633,485 B2 * | 12/2009 | Reed et al. .................... 345/156 |
| 2002/0021282 A1 * | 2/2002 | Masudaya .................... 345/156 |
| 2004/0046751 A1 * | 3/2004 | Heimermann et al. ....... 345/184 |
| 2004/0174387 A1 * | 9/2004 | Nonaka ......................... 345/684 |
| 2005/0034549 A1 | 2/2005 | Braud |
| 2005/0077156 A1 * | 4/2005 | Ushimaru et al. ............ 200/6 A |
| 2006/0082545 A1 * | 4/2006 | Choquet et al. .............. 345/156 |
| 2006/0132469 A1 * | 6/2006 | Lai et al. ...................... 345/184 |

FOREIGN PATENT DOCUMENTS

| | | |
|---|---|---|
| DE | 42 06 515 C1 | 3/1993 |
| DE | 100 12 753 A1 | 6/2001 |
| EP | 1 507 184 A2 | 2/2005 |
| JP | 7-114859 A | 5/1995 |
| JP | 11-339601 A | 12/1999 |
| JP | 2000-149719 A | 5/2000 |
| JP | 2000-149721 A | 5/2000 |
| JP | 2001-28223 A | 1/2001 |
| JP | 2002-287892 A | 10/2002 |
| JP | 2003-62339 A | 3/2003 |
| JP | 2003-72486 A | 3/2003 |
| JP | 2003-525490 A | 8/2003 |
| JP | 2004-21735 A | 1/2004 |
| JP | 2004-246676 A | 9/2004 |
| KR | 2001-0049777 A | 6/2001 |
| WO | WO-92/03774 A1 | 3/1992 |

* cited by examiner

INTERFACE DEVICE

TECHNICAL FIELD

The present invention relates to an interface device in which an operating knob for outputting an operation command signal to in-vehicle equipment such as a navigation system installed in a vehicle is supported on an operating knob support portion.

BACKGROUND ART

An arrangement in which, in order to output an operation command signal to in-vehicle equipment such as vehicle audio equipment, a plurality of switches are disposed so as to be adjacent to a fixed or rotary palm rest provided on a dashboard, and the switches are operated by an occupant using a fingertip while placing a palm on the palm rest, is known from Patent Publication 1 below.
Patent Publication 1: Japanese Patent Application Laid-open No. 2003-72486

DISCLOSURE OF INVENTION

Problems to be Solved by the Invention

However, in the arrangement disclosed in Patent Publication 1 above, when the palm rest is a fixed type, if the positional relationship between the palm rest and the palm is out of alignment, since the positional relationship between the fingertip and the switches is out of alignment there is a possibility that, unless the occupant visually checks the type of switch before operating it, an erroneous operation will occur, and there is the problem that the operability and reliability becomes poor. When the palm rest is a rotary type, since the positional relationship between the palm rest and the switches changes greatly, there is the problem that it is even easier for an erroneous operation to occur.

The present invention has been accomplished in the light of the above circumstances, and it is an object thereof to enhance the operability of an interface device having an operating knob for outputting an operation command signal to in-vehicle equipment.

Means for Solving the Problems

In order to attain the above object, according to a first aspect of the present invention, there is proposed an interface device in which an operating knob for outputting an operation command signal to in-vehicle equipment installed in a vehicle is supported on an operating knob support portion, characterized in that the operating knob has a palm rest portion for an occupant's palm to be placed on, and a switch for outputting an operation command signal to the in-vehicle equipment is disposed on the operating knob within a region that a fingertip can reach while the palm is placed on the palm rest portion.

According to a second aspect of the present invention, in addition to the first aspect, tilting the operating knob in fore-and-aft and left-and-right directions outputs an operation command signal to the in-vehicle equipment, and when the operating knob tilts a gap into which a fingertip can go is formed between the operating knob and a member therebeneath.

According to a third aspect of the present invention, in addition to the first or second aspect, the operating knob has a fore-and-aft length in the range of 75 mm to 85 mm.

According to a fourth aspect of the present invention, there is proposed an interface device in which an operating knob for outputting an operation command signal to in-vehicle equipment installed in a vehicle is supported on an operating knob support portion, characterized in that when the height of the operating knob is L1 and a gap between the lower end of the operating knob and a member therebeneath is L2, L1>L2 holds, the operating knob comprises a finger rest portion, forward of a rear side palm rest portion, for an occupant to put a finger on, and when the fore-and-aft length of the palm rest portion is L3, and the diameter of a scroll switch provided on the operating knob, the diameter corresponding to the fore-and-aft length of the finger rest portion, is L4, L3>2×L4 holds.

According to a fifth aspect of the present invention, there is proposed an interface device in which an operating knob for outputting an operation command signal to a navigation system installed in a vehicle is supported on an operating knob support portion, characterized in that tilting the operating knob in fore-and-aft and left-and-right directions outputs an operation command signal to the navigation system and operation of a switch provided integrally with the operating knob outputs an operation command signal to the navigation system, and a map image of the navigation system is moved in fore-and-aft and left-and-right directions by the operation command signal due to tilting of the operating knob.

According to a sixth aspect of the present invention, in addition to the fifth aspect, the switch is disposed within a region that a fingertip can reach while a palm is placed on the operating knob.

A cover 17 of an embodiment corresponds to the member beneath the operating knob of the present invention, a base plate 18 of the embodiment corresponds to the operating knob support member, and a main switch 31 and a sub switch 32 of the embodiment correspond to the switch of the present invention.

Effects of Invention

In accordance with the first aspect of the present invention, since the palm rest portion for placing an occupant's palm on is provided on the operating knob of the interface device for in-vehicle equipment, and the switch is disposed on the operating knob within a region that the fingertip can reach while the palm is placed on the palm rest portion, when the palm is placed on the palm rest portion the positional relationship between the switch and the fingertip is determined; even if the switch is operated without being visually checked it is possible to prevent an erroneous operation from occurring and, moreover, the operability is remarkably improved.

In accordance with the second aspect of the present invention, when an operation command signal is outputted to the in-vehicle equipment by tilting the operating knob in a fore-and-aft or left-and-right direction, since a gap into which the fingertip can go is formed between the operating knob and the member therebeneath, it is possible to prevent the fingertip from interfering with the member beneath the operating knob, thus enhancing the operability.

In accordance with the third aspect of the present invention, since the operating knob has a length in the fore-and-aft direction of 75 mm to 85 mm, the operating knob has dimensions such that it is easily gripped by a person's hand, thus enhancing the operability.

In accordance with the fourth aspect of the present invention, since, when the height of the operating knob is L1, and the gap between the lower end of the operating knob and the member therebeneath is L2, L1>L2 holds, it is possible to prevent the operating knob from greatly projecting from the member therebeneath, thus making it compact. Furthermore, since the operating knob is provided with a finger rest portion, forward of the rear side palm rest portion, for the occupant to put a finger on, and when the fore-and-aft length of the palm rest portion is L3 and the diameter of the scroll switch provided on the operating knob, the diameter corresponding to the fore-and-aft length of the finger rest portion, is L4, L3>2× L4 holds, not only is it possible to ensure that the dimensions of the palm rest portion are sufficient, but also the scroll switch can be rotated smoothly by the fingertip.

In accordance with the fifth aspect of the present invention, since, when tilting the operating knob in fore-and-aft and left-and-right directions, the map image of the navigation system is moved in fore-and-aft and left-and-right directions, it is possible to move the map image very easily and, moreover, an operation command signal can be outputted by operation of the switch, which is provided integrally with the operating knob, thus making operation of the navigation system easy.

In accordance with the sixth aspect of the present invention, since the switch is disposed within a region that the fingertip can reach while the palm is placed on the operating knob, it is unnecessary to search for the switch, thus improving the operability.

EXPLANATION OF REFERENCE NUMERALS AND SYMBOLS

17 Cover (member beneath operating knob)
18 Base plate (operating knob support portion)
30 Operating knob
30a Palm rest portion
30b Finger rest portion
31 Main switch (switch)
32 Sub switch (switch)
33 Scroll switch

BEST MODE FOR CARRYING OUT THE INVENTION

Modes for carrying out the present invention are explained below by reference to embodiments of the present invention shown in the attached drawings.

Embodiment 1

FIG. 1 to FIG. 12 show a first embodiment of the present invention.

Figure 1:
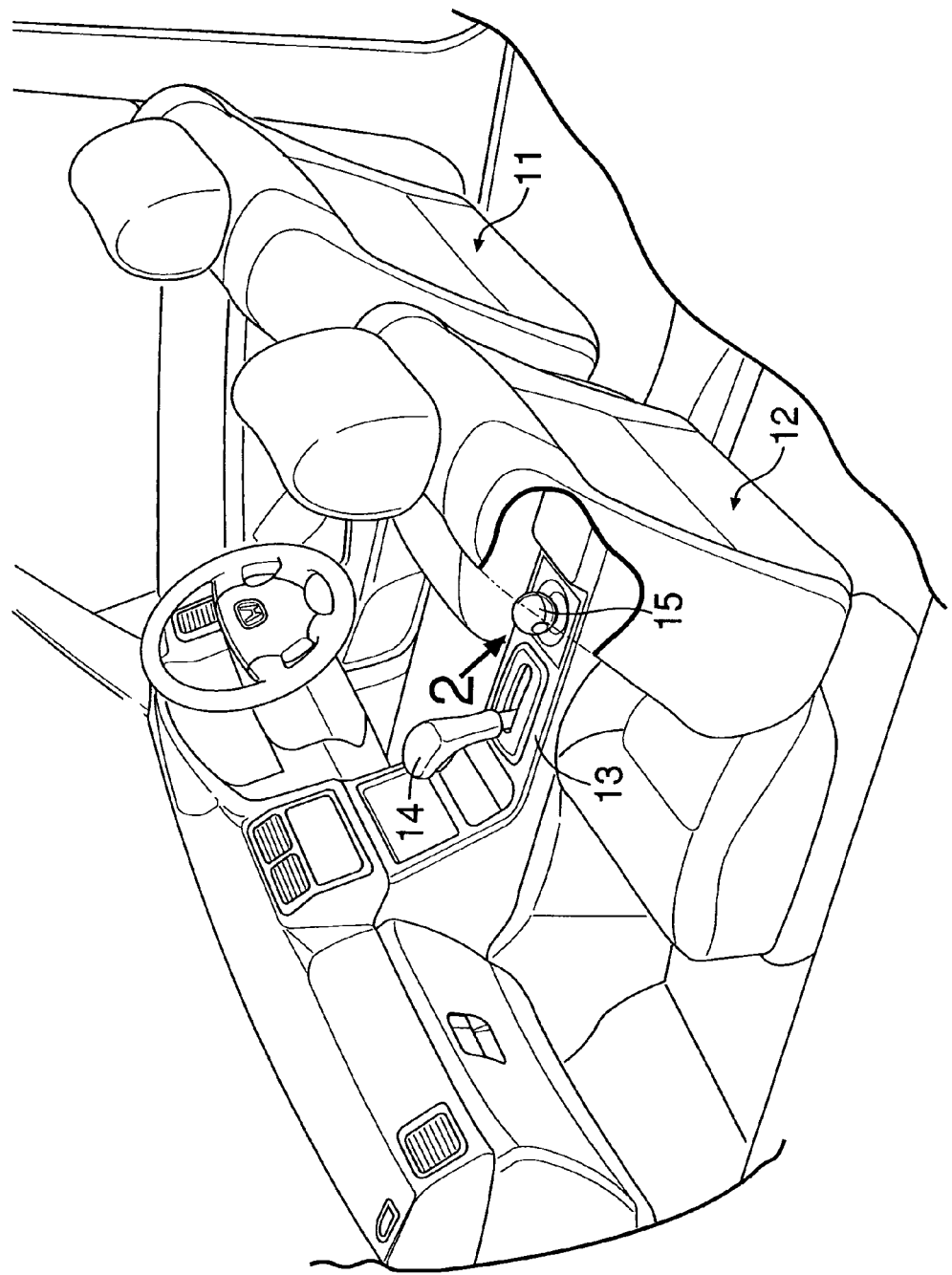
FIG. 1 is a perspective view of a vehicle compartment front part of a motor vehicle (first embodiment).
Figure 2:
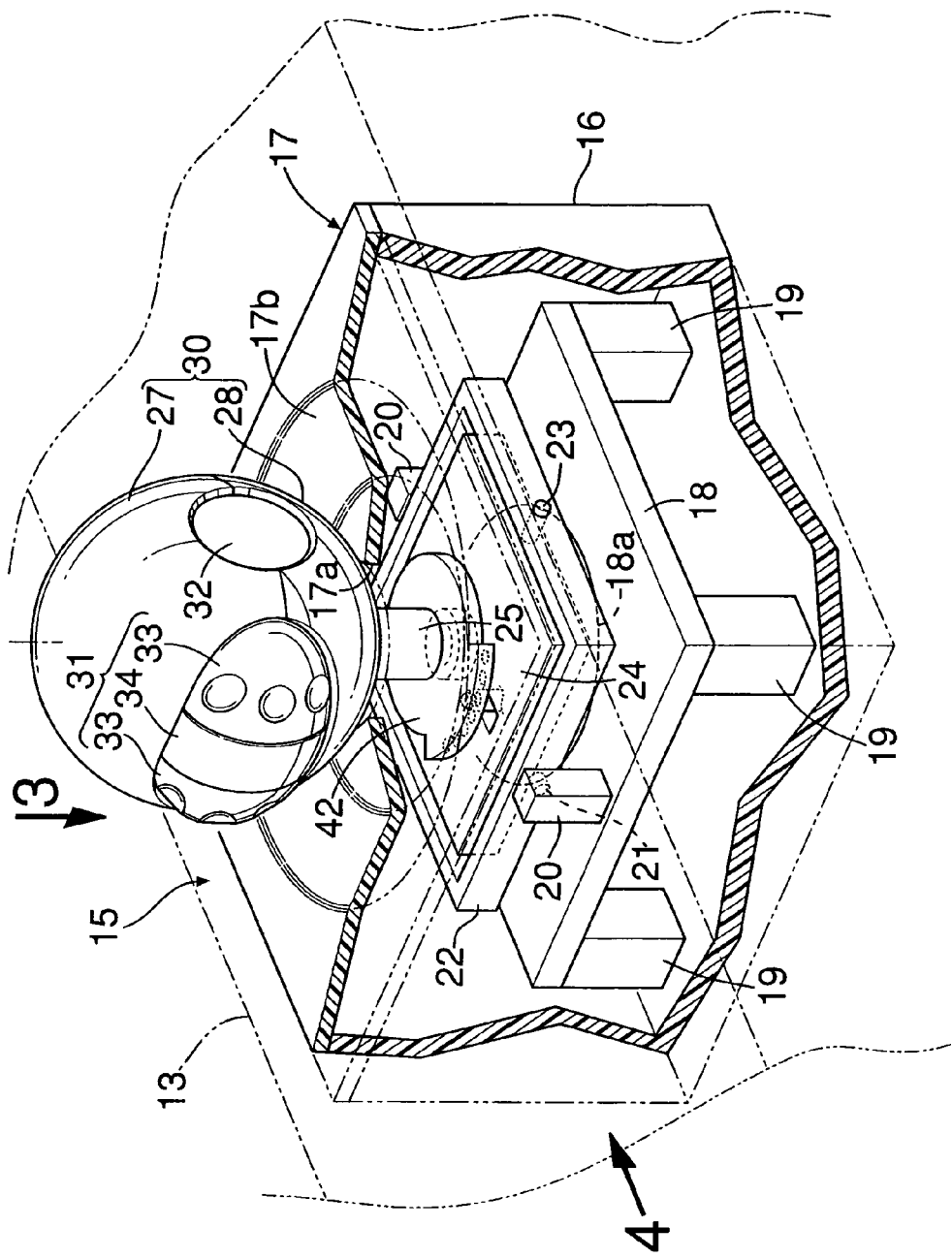
FIG. 2 is an enlarged view from the direction of arrow 2 in FIG. 1 (first embodiment).
Figure 3:
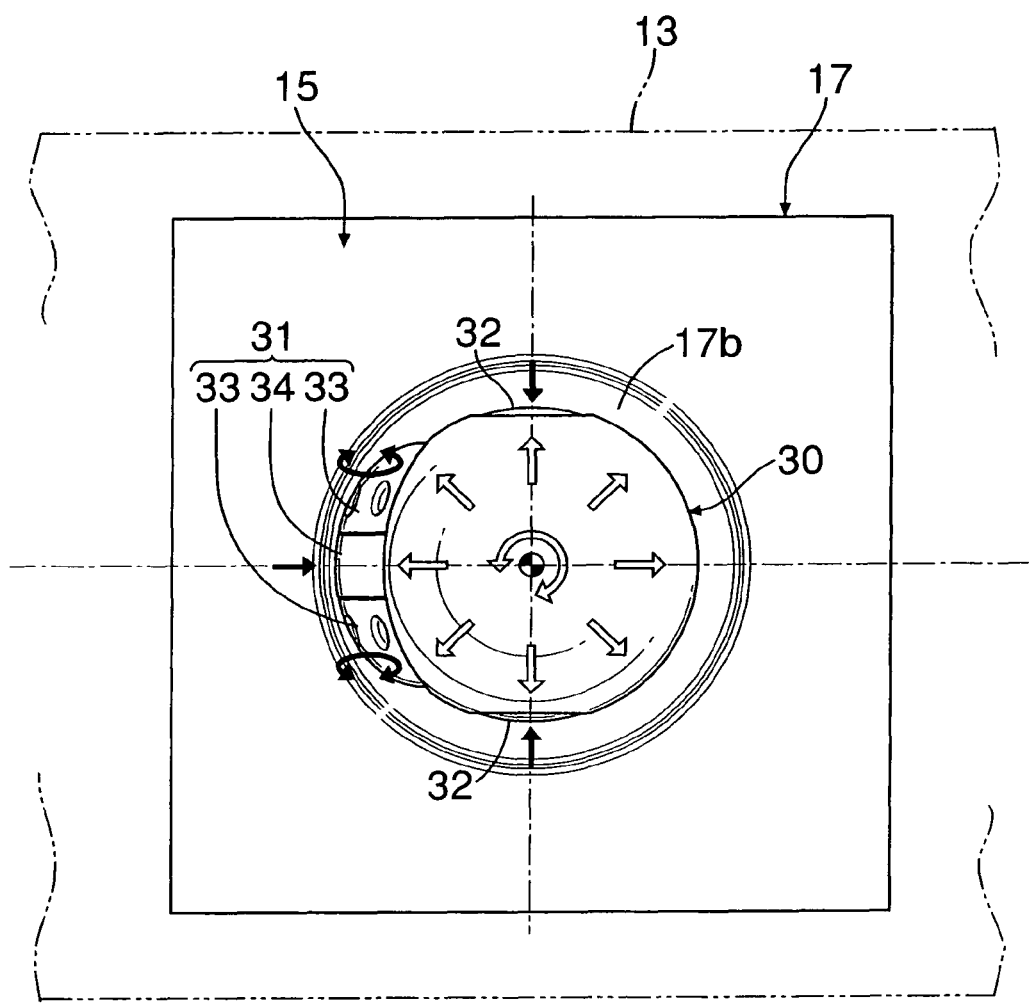
FIG. 3 is a view from the direction of arrow 3 in FIG. 2 (first embodiment).
Figure 4:
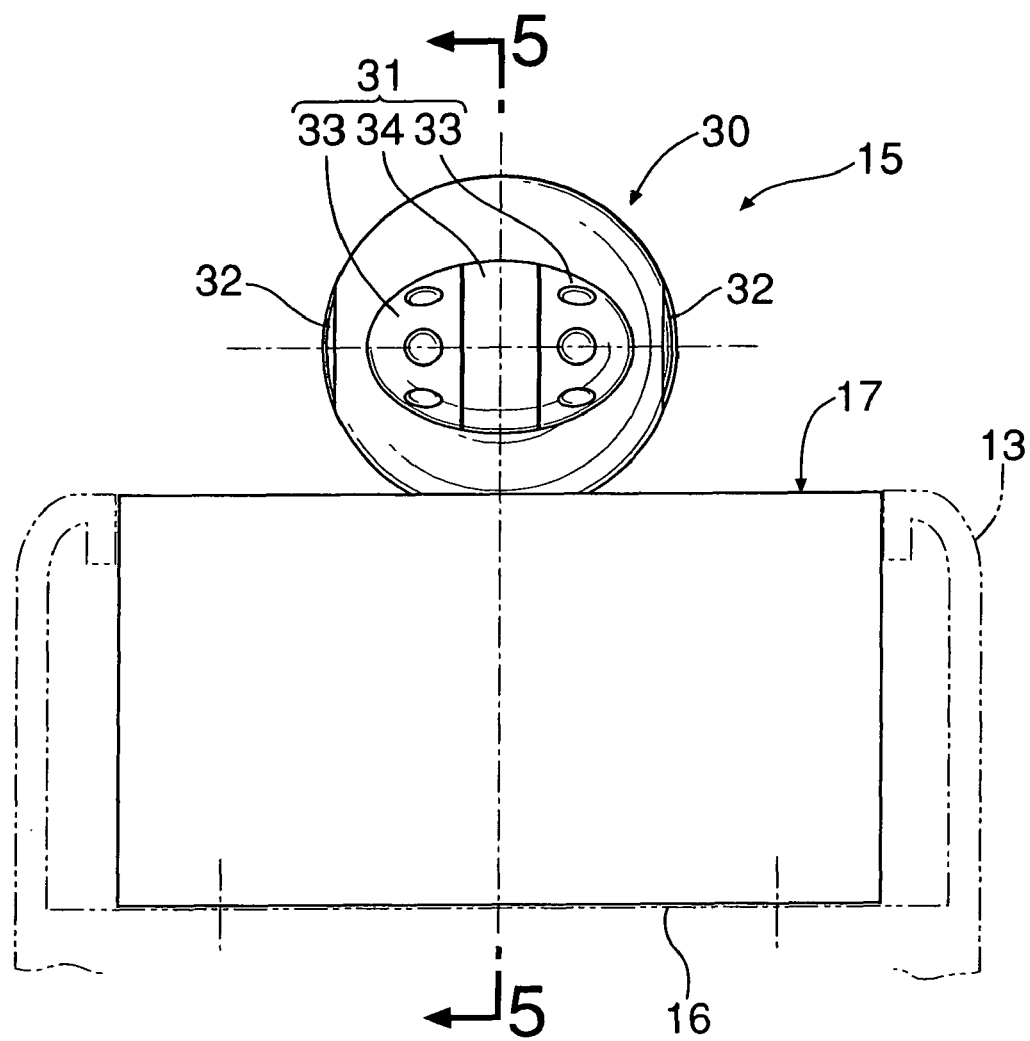
FIG. 4 is a view from the direction of arrow 4 in FIG. 2 (first embodiment).

As shown in FIG. 1, a shift lever 14 is disposed on an upper face of a center console 13 extending in the fore-and-aft direction between a driver's seat 11 and a passenger seat 12 of a passenger vehicle, and an interface device 15 is disposed to the rear of the shift lever 14.

As shown in FIG. 1 to FIG. 9, the interface device 15 includes a box-shaped casing 16 and a cover 17 covering an upper face of the casing 16, and a base plate 18 is supported within the casing 16 via four support legs 19. A frame-shaped outer gimbal 22 is supported, via pins 21 and 21, so that it can swing in the left-and-right direction between a pair of front and rear support posts 20 and 20 uprightly provided on an upper face of the base plate 18, and a plate-shaped inner gimbal 24 is supported, via a pair of left and right pins 23 and 23, so that it can swing in the fore-and-aft direction within the outer gimbal 22. The inner gimbal 24 can therefore swing in fore-and-aft and left-and-right directions relative to the base plate 18.

An upper support shaft 24a and a lower support shaft 24b project vertically from the center of the inner gimbal 24, and the inner periphery of the lower end of a rotary shaft 25 is rotatably fitted around the outer periphery of the upper end of the upper support shaft 24a and retained by a bolt 26. The upper half of the rotary shaft 25 runs through an opening 17a formed in the cover 17 and projects upward. An upper knob half 27 and a lower knob half 28 are fitted together so as to sandwich from above and below a projection 25a projecting rearward from the upper end of the rotary shaft 25 and are integrally tightened together via bolts 29 and 29. The upper knob half 27 and the lower knob half 28 form in cooperation with each other a spherical operating knob 30, and since this operating knob 30 is connected to the base plate 18 via the rotary shaft 25, it can tilt in fore-and-aft and left-and-right directions together with the base plate 18.

In this embodiment, the operating knob 30 has a diameter of 80 mm, and employing this dimension enables the operating knob 30 to be easily gripped by a person's hand. Furthermore, the operating knob 30 includes a palm rest portion 30a on the rear side and a finger rest portion 30b on the front side, and the border between the palm rest portion 30a and the finger rest portion 30b is at point P in FIG. 5. This point P is a portion corresponding to base parts of an index finger and a middle finger when the operating knob 30 is gripped naturally.

A main switch 31 is provided on the front face of the operating knob 30, and a pair of sub switches 32 and 32 are provided on opposite side faces on the left and right of the operating knob 30. The main switch 31 is formed from a scroll switch 33 and an execution switch 34, the scroll switch 33, which is divided into left and right portions, is capable of rotating around a support shaft 35 supported at the front end of the rotary shaft 25, and the execution switch 34, which is sandwiched by the divided scroll switch 33, is capable of swinging rearward around a support shaft 36 disposed above the support shaft 35 of the scroll switch 33. The rotational angle of the scroll switch 33 is detected by a rotary encoder 37 provided between the support shaft 35 and the rotary shaft 25, and operation of the execution switch 34 is detected by a switching element 38 provided on the rotary shaft 25. The left and right sub switches 32 and 32 mainly exhibit the function of a cancel switch, and operation thereof is detected by switching elements 39 and 39 provided on the rotary shaft 25.

A partially spherical recess 18a is formed in a middle part of the base plate 18, and a star-shaped guide groove 18b extending radially in eight directions is formed in the recess 18a. A sliding member 40 is housed in a hollow portion 24c formed in the interior of the lower support shaft 24b of the inner gimbal 24, and the sliding member 40 is urged downward by means of a spring 41 so that a hemispherical sliding portion 40a formed at the lower end of the sliding member 40 abuts against the guide groove 18b.

Figure 9:
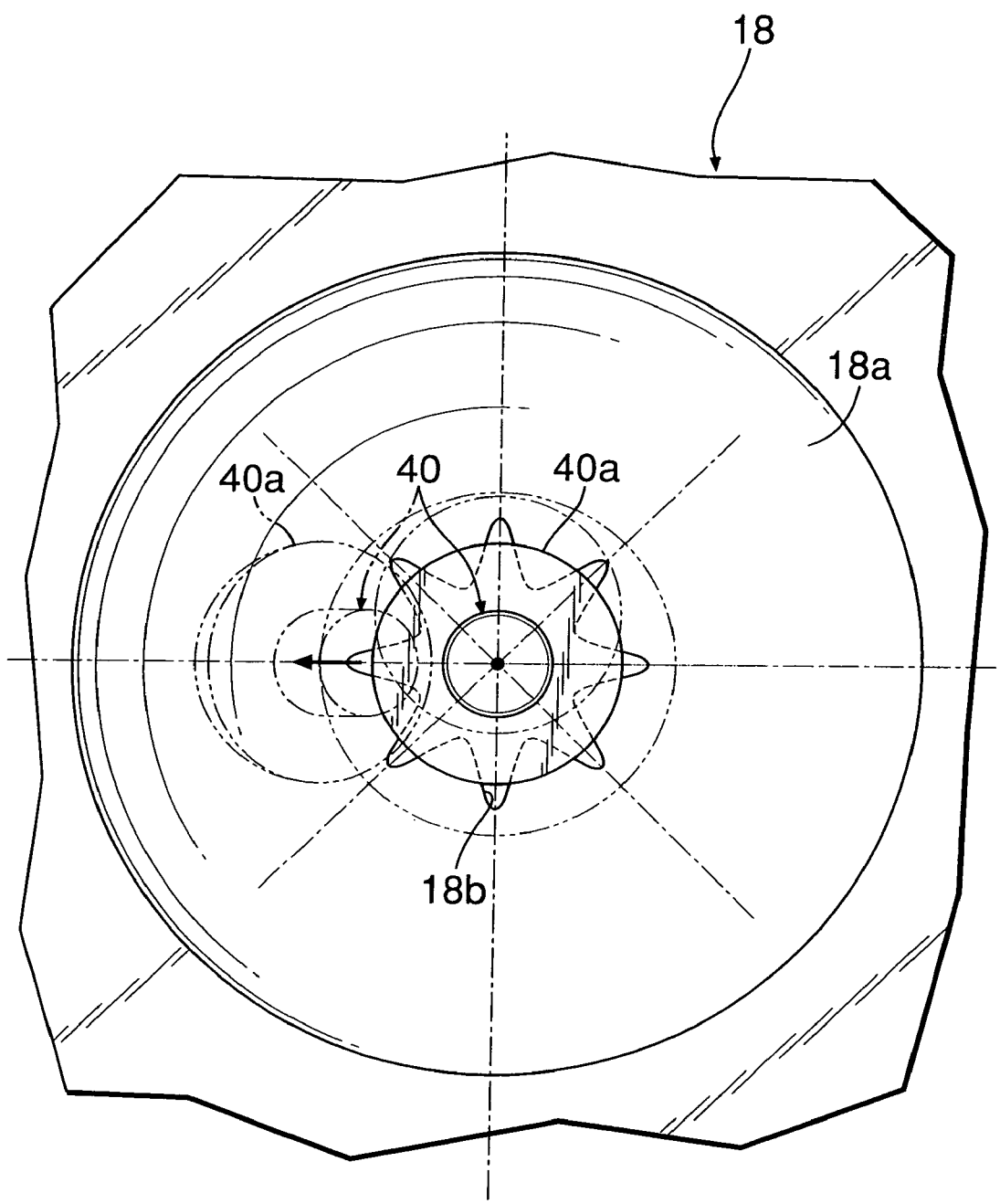
FIG. 9 is a sectional view along line 9-9 in FIG. 5 (first embodiment).
Figure 10:
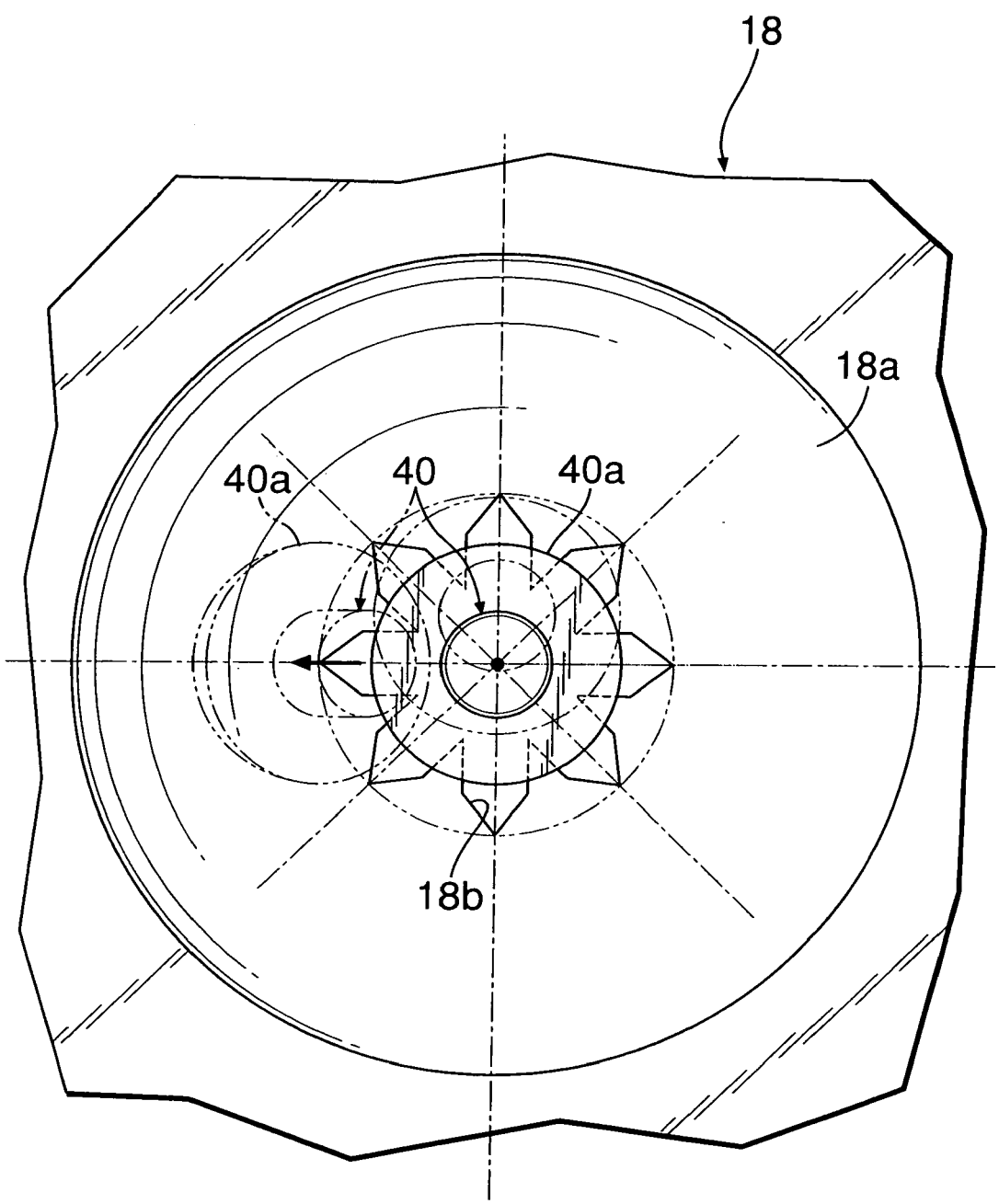
FIG. 10 is a view, corresponding to FIG. 9, showing a modified example of a guide groove (first embodiment).

The shape of each groove of the guide groove 18b is simply tapered from radially inside to outside in the first embodiment shown in FIG. 9, and in a modified example shown in FIG. 10 it first has a fixed width and is then tapered from radially inside to outside.

A disk-shaped click plate 42 is formed integrally with the lower end of the rotary shaft 25, seven click holes 42a are formed in the lower face of the click plate 42 on a circumference with the rotary shaft 25 as the center, and one click hole 42b is formed radially inside the seven click holes 42a. An intermediate section of a ball holder 44 is pivotably supported on the inner gimbal 24 via a support shaft 43, and a ball 45 housed within the ball holder 44 is urged by means of a spring 46 so that it can fit into any of the click holes 42a and 42b. A solenoid 47 supported on a lower face of the inner gimbal 24 is connected to the lower end of the ball holder 44 by means of a rod 48, and making the ball holder 44 swing around the support shaft 43 by making the solenoid 47 expand and contract enables the ball 45 to move between a radially outside position in which it fits into the click holes 42a and a radially inside position in which it fits into the click hole 42b. The rotational angle of the rotary shaft 25 relative to the inner gimbal 24 is detected by a rotary encoder 49.

The operation of the first embodiment having the above-mentioned arrangement is now explained.

The operating knob 30 is capable of tilting in eight directions, that is, forward, rearward, rightward, leftward, right-forward, left-forward, right-rearward, and left-rearward, these eight directions corresponding to the directions in which the guide groove 18b of the recess 18a of the base member 18 shown in FIG. 9 and FIG. 10 extends. That is, when the operating knob 30 tiltably supported via the outer gimbal 22 and the inner gimbal 24 is in a neutral position, the sliding portion 40a of the sliding member 40 made to project downward from the lower support shaft 24b integral with the operating knob 24 by the resilient force of the spring 41 engages with the center of the star-shaped guide groove 18b in a stable manner, thereby holding the operating knob 30 in the neutral position. Furthermore, when the operating knob 30 is released from the hand when in a tilted position, it is returned to the neutral position by return means (not illustrated).

From this state, tilting the operating knob 30 in one direction among the eight directions allows the sliding portion 40a of the sliding member 40 to be guided along the tapered guide groove 18b from radially inside to outside; as the groove width of the guide groove 18b decreases, the sliding member 40 is pushed into the hollow portion 24c of the lower support shaft 24b against the resilient force of the spring 41, and a predetermined load is produced in tilting the operating knob 30.

Figure 11:
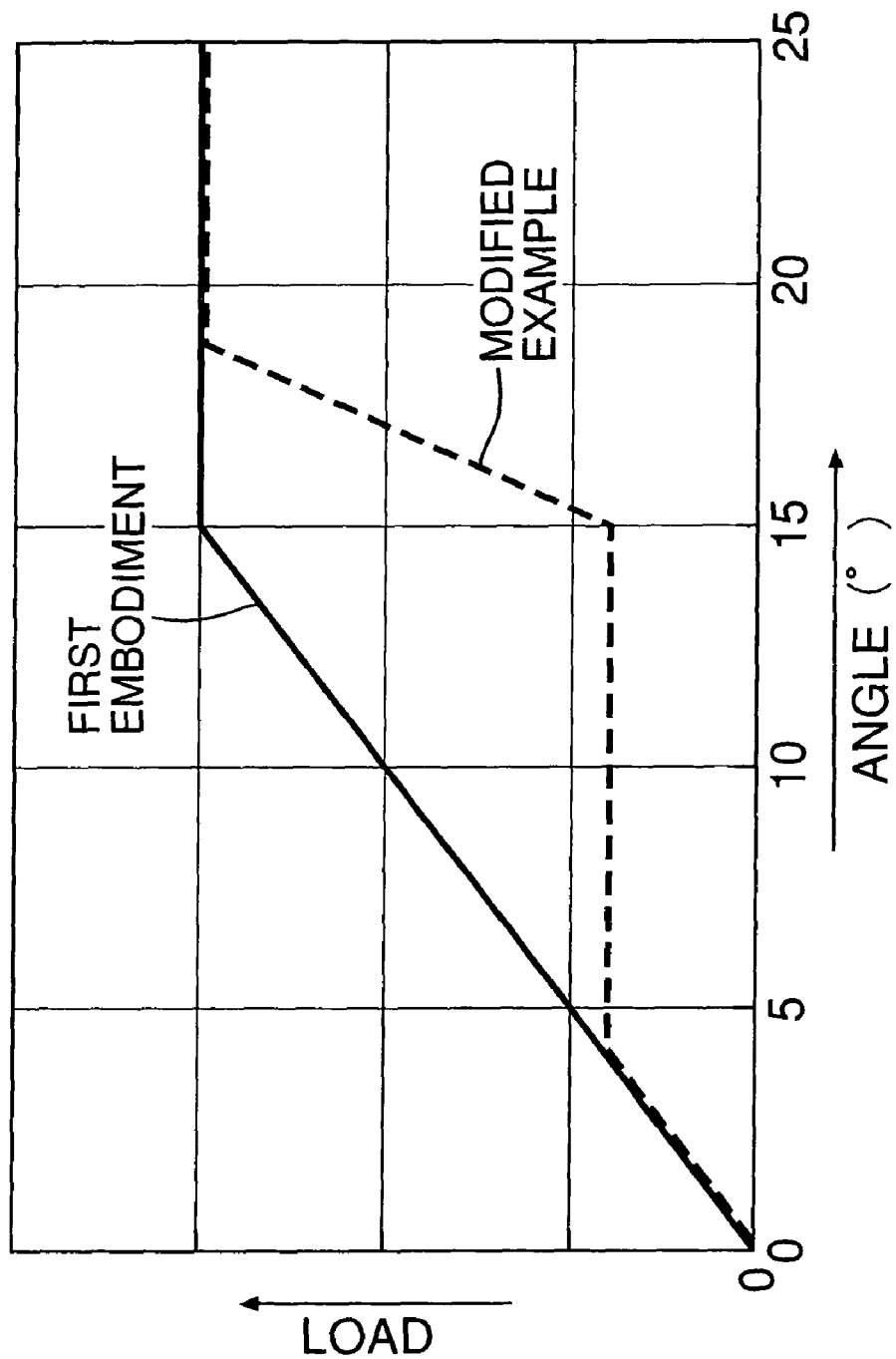
FIG. 11 is a graph showing the relationship between tilt angle and load of an operating knob (first embodiment).

The solid line in FIG. 11 corresponds to the guide groove 18b (first embodiment) in FIG. 9; as the tilt angle of the operating knob 30 increases the load increases linearly, and when the sliding portion 40a rides past the guide groove 18b the load attains a fixed value.

The broken line in FIG. 11 corresponds to the guide groove 18b in FIG. 10 (modified example of the first embodiment); the load increases linearly as the tilt angle of the operating knob 30 increases until the sliding portion 40a engages with the parallel portion of the guide groove 18b, the load is then held at a fixed value while the sliding portion 40a slides against the parallel portion of the guide groove 18b, the load increases linearly while the sliding portion 40a slides against the tapered portion of the guide groove 18b, and the load attains a fixed value when the sliding portion 40a rides past the guide groove 18b.

In this way, restraint is given to tilting of the operating knob 30 in accordance with the shape of the guide groove 18b, thus enhancing the operational feel, and even when the operating knob 30 is operated in a direction that deviates from the eight directions, the operating knob 30 can be guided in the correct direction by the effect of the guide groove 18b.

In this way, tilting the operating knob 30 in the eight directions allows contacts, which are not illustrated, to be closed, thus outputting a signal corresponding to the tilt direction to control means.

Furthermore, rotating the operating knob 30 left or right allows the rotary shaft 25, which is integral with the operating knob 30, to rotate relative to the upper support shaft 24a, and the click plate 42, which is integral with the rotary shaft 25, to rotate relative to the inner gimbal 24. When the solenoid 47 is expanded by the operation of a switch (not illustrated) and the ball holder 44 swings to a position in the clockwise direction in FIG. 5, the position of the ball 45 moves radially inward, and the ball 45 accordingly fits into the one click hole 42b, which is on the radially inner side of the click plate 42, thus stably holding the operating knob 30 in a neutral position in a pivoting direction. When the operating knob 30 is rotated in a left or right direction from this state, since a load occurs as the ball 45 is detached from the click hole 42b against the resilient force of the spring 46, restraint can be given to pivoting of the operating knob 30 from the neutral position.

Figure 5:
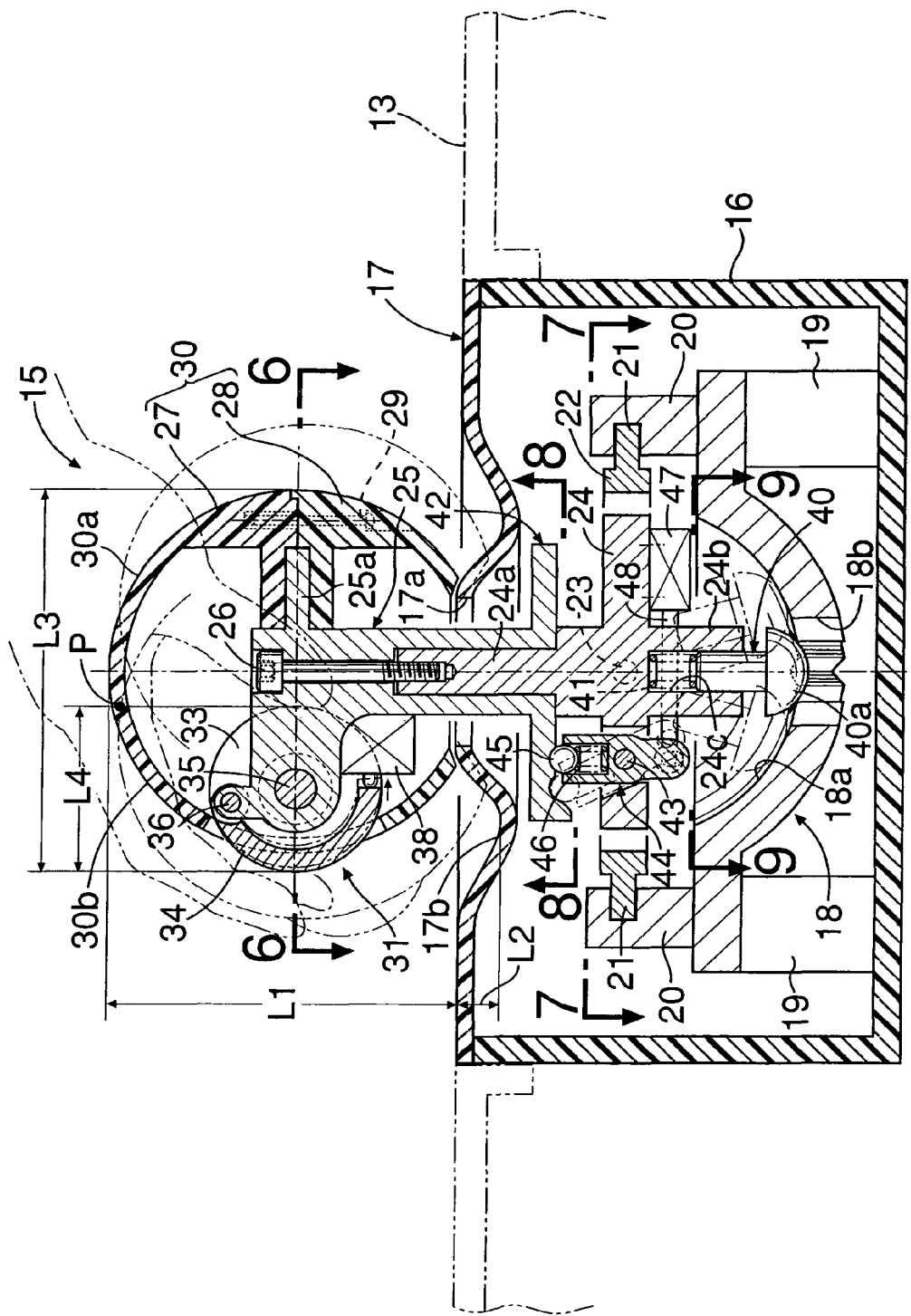
FIG. 5 is a sectional view along line 5-5 in FIG. 4 (first embodiment).
Figure 6:
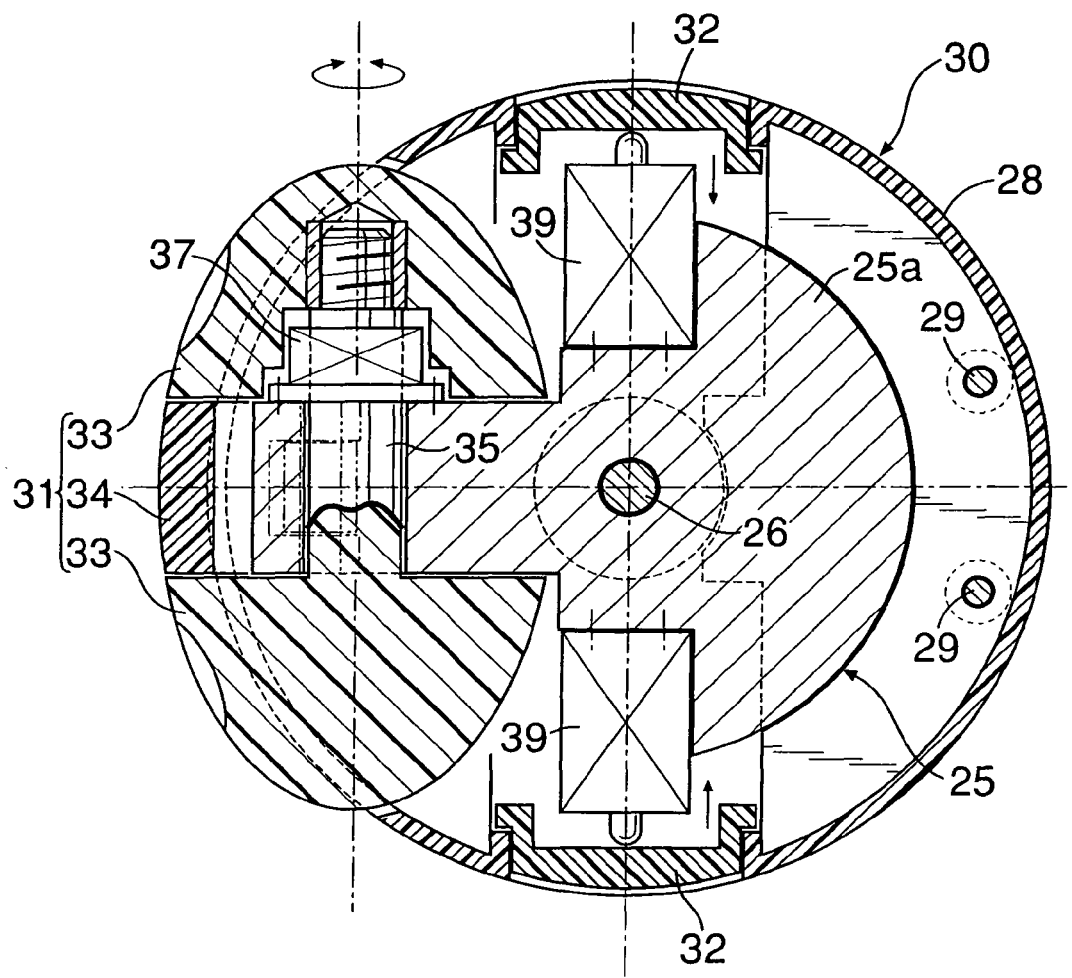
FIG. 6 is a sectional view along line 6-6 in FIG. 5 (first embodiment).
Figure 7:
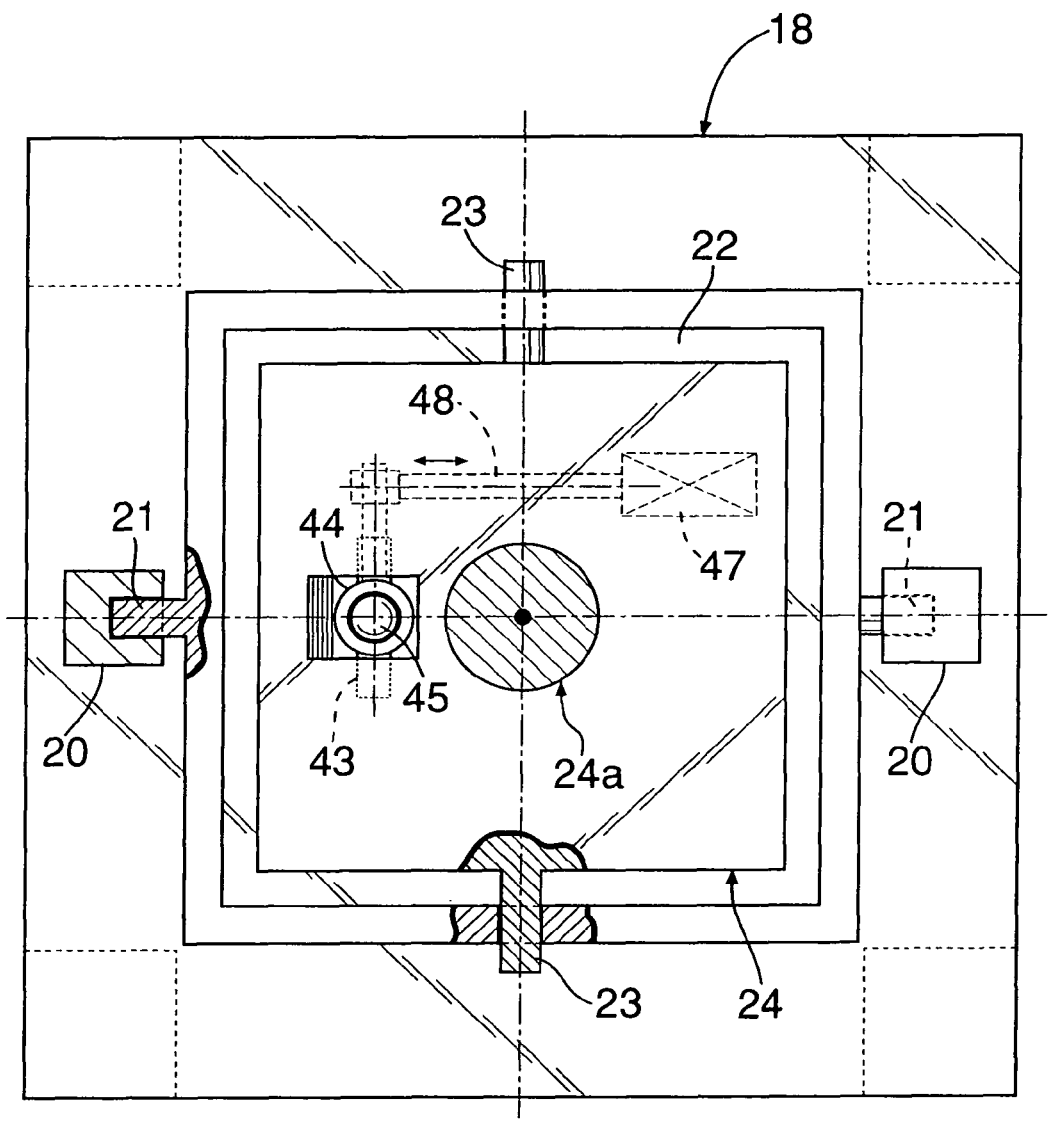
FIG. 7 is a sectional view along line 7-7 in FIG. 5 (first embodiment).
Figure 8:
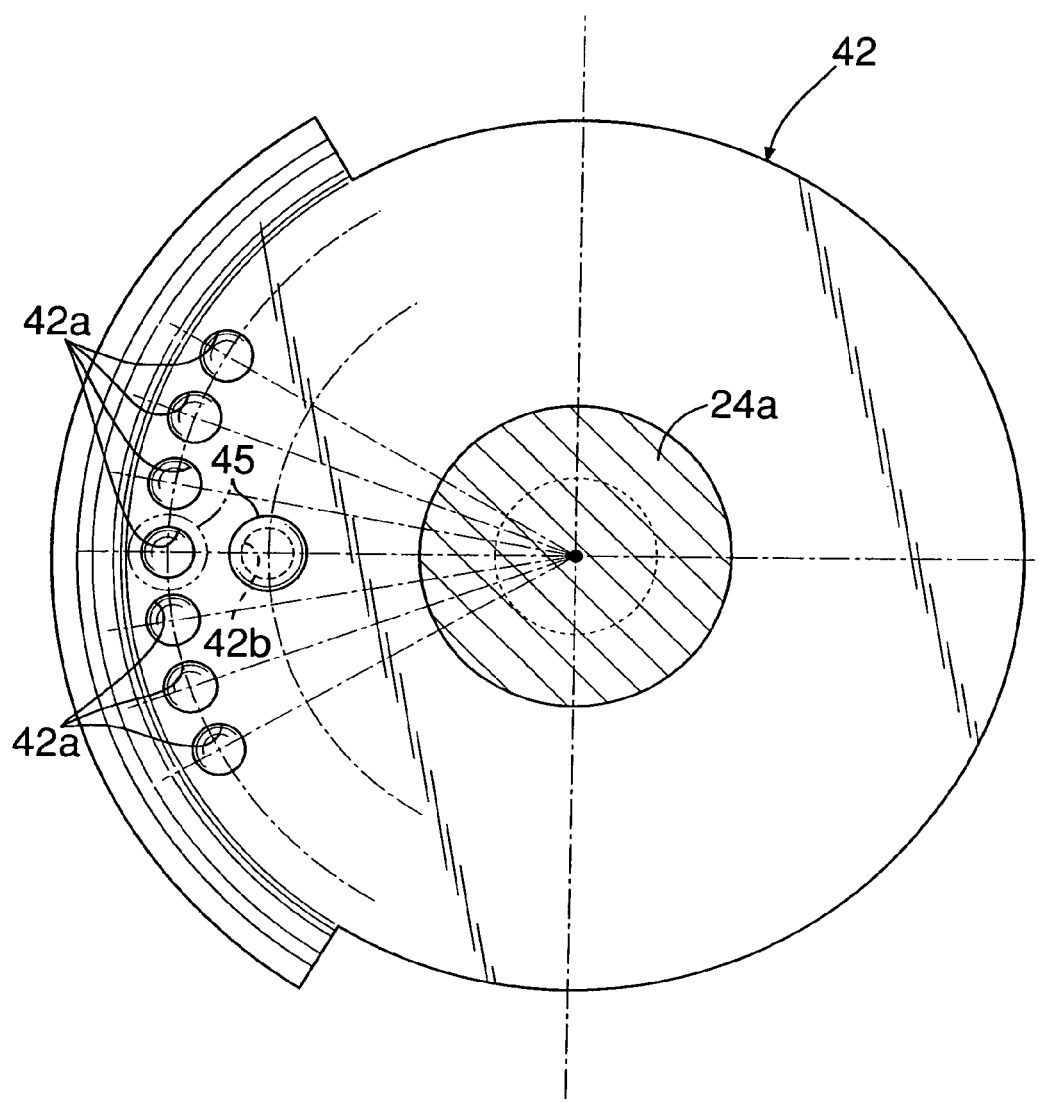
FIG. 8 is a sectional view along line 8-8 in FIG. 5 (first embodiment).

Furthermore, when the solenoid 47 is contacted by the operation of a switch (not illustrated) and the ball holder 44 swings to a position in the anticlockwise direction in FIG. 5, the position of the ball 45 moves radially outward, and the ball 45 accordingly fits into any of the seven click holes 42a, which are present on the radially outer side of the click plate 42, thus stably holding the operating knob 30 in seven positions in the pivoting direction. When the operating knob 30 is rotated in a left or right direction, since a load occurs as the ball 45 is detached from the click hole 42a against the resilient force of the spring 46, restraint can be given to pivoting of the operating knob 30.

In this way, when the operating knob 30 pivots, the rotary encoder 49 outputs a signal corresponding to the pivot position to a control device. Positional limits of the pivoting angle of the operating knob 30 are 25° for each of left and right relative to the neutral position, and when the operating knob 30 is released from the hand after being operated it is automatically returned to the neutral position by return means (not illustrated). Since the range through which the operating knob 30 can pivot is limited to 25° for each of left and right relative to the neutral position, an occupant can operate the operating knob 30 without changing grip, thus improving the operability.

When the occupant grips the operating knob 30, the palm is supported on the palm rest portion 30a of the operating knob 30, and the middle finger and the index finger are supported on the finger rest portion 30b, which is in front of the palm rest portion 30a. Since, in this state, the tips of the middle finger and the index finger abut against the main switch 31, a rotation operation of the scroll switch 33 and a pushing down operation of the execution switch 34 can be carried out smoothly, and a pushing down operation of the left and right sub switches 32 and 32 can be carried out smoothly by the thumb and the third finger.

As is clear from FIG. 5, a recess 17b for ensuring that there is a space around the opening 17a of the cover 17 is formed so that, when the operating knob 30 is gripped and tilted, a finger tip is not caught between the lower end of the operating knob 30 and the cover 17. When the vertical height of the operating knob 30 is L1, and the height between the lower end of the operating knob 30 and the deepest part of the recess 17b is L2, L1>L2 holds. It is thus possible to prevent the operating knob 30 from greatly projecting from the cover 17 and prevent it from interfering with operation of the shift lever 14.

Furthermore, when the fore-and-aft length of the operating knob 30, including the main switch 31, is L3, and the fore-and-aft length of the finger rest portion 30b (=diameter of main switch 31) is L4, the right-hand end part of L4 in FIG. 5 being, for example, although not shown, the branching point of the index finger and the middle finger as a reference point, the relationship L3>2×L4 between L3 and L4 holds. As a result, not only can the palm be supported stably by ensuring that the dimensions of the palm rest portion 30a of the operating knob 30 are sufficient, but it is also possible to operate the main switch 31 (in particular, the scroll switch 34) smoothly.

As described above, since the main switch 31 and the sub switches 32 and 32 are provided on the operating knob 30, which outputs a signal by tilting in the eight directions and pivoting around its own axis within the range of 25° to each of the left and right, it is possible to output a large number of commands by a combination of a signal due to the attitude (position) of the operating knob 30 and a signal due to the operation of the main switch 31 and the sub switches 32 and 32. Furthermore, since the main switch 31 and the sub switches 32 and 32 are provided on the operating knob 30, when the operating knob 30 is gripped, the fingertips naturally reach the main switch 31 and the sub switches 32 and 32, and the main switch 31 and the sub switches 32 and 32 can be operated easily without searching for their positions, thus reliably preventing the occurrence of an erroneous operation.

The functions of the interface device 15 are now explained.

The interface device 15 controls a plurality of systems such as a navigation system, an audio system, and an air conditioning system through a monitor screen by a combination of operations of the operating knob 30, the main switch 31, and the sub switches 32 and 32.

In the main switch 31, a menu screen is called from an initial screen by pushing down the execution switch 34, and a decision is made by selecting an item by rotation of the scroll switch 33 and pushing down the execution switch 34. The sub switches 32 and 32 sequentially switch between menu screens; when shifted to a lower level screen, they function as a cancel switch, and when shifted through multiple stages of lower level screens, they function as a cancel switch for returning directly to the menu screen by a long push.

Figure 12:
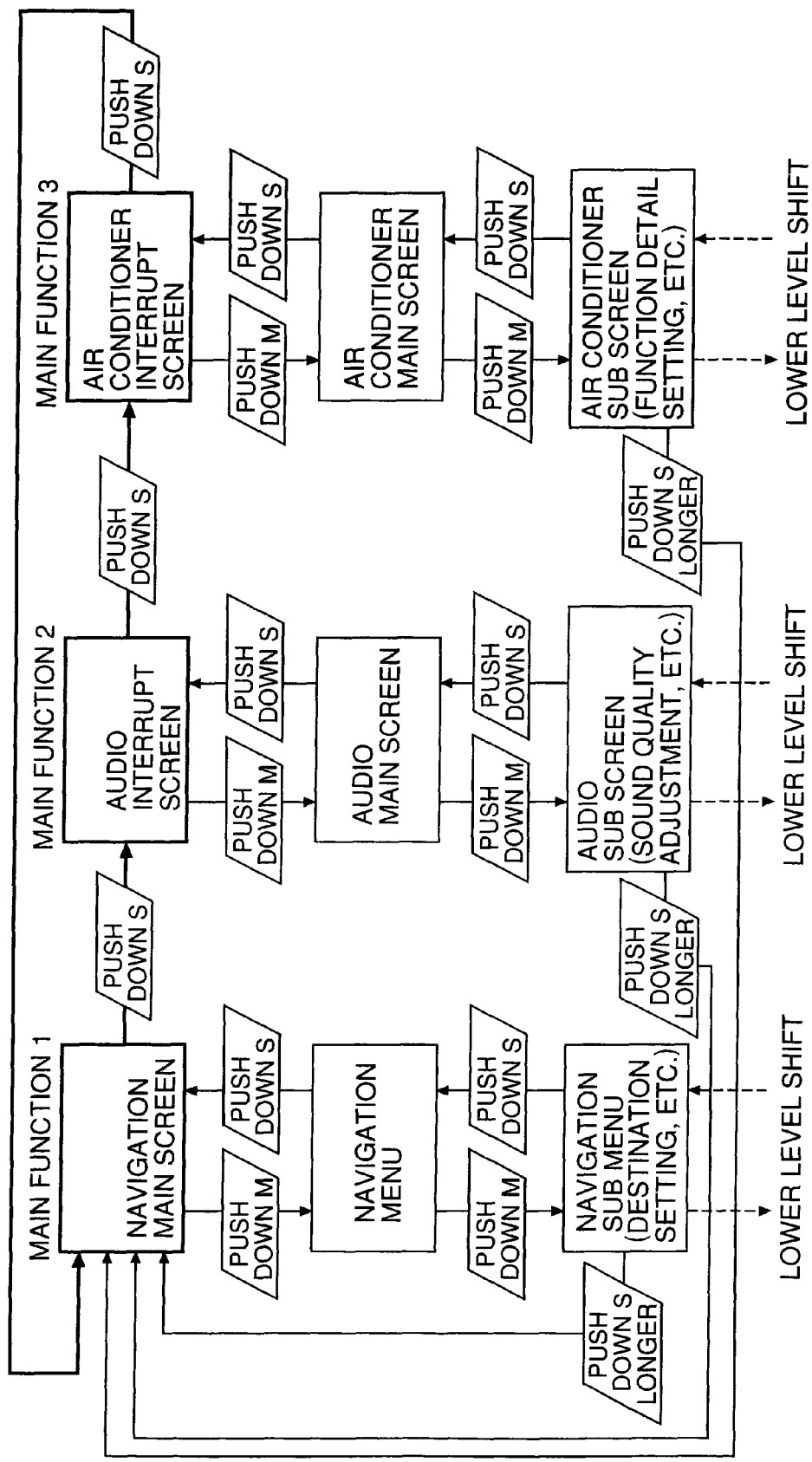
FIG. 12 is a diagram for explaining the functions of a main switch and a sub switch (first embodiment).
Figure 13:
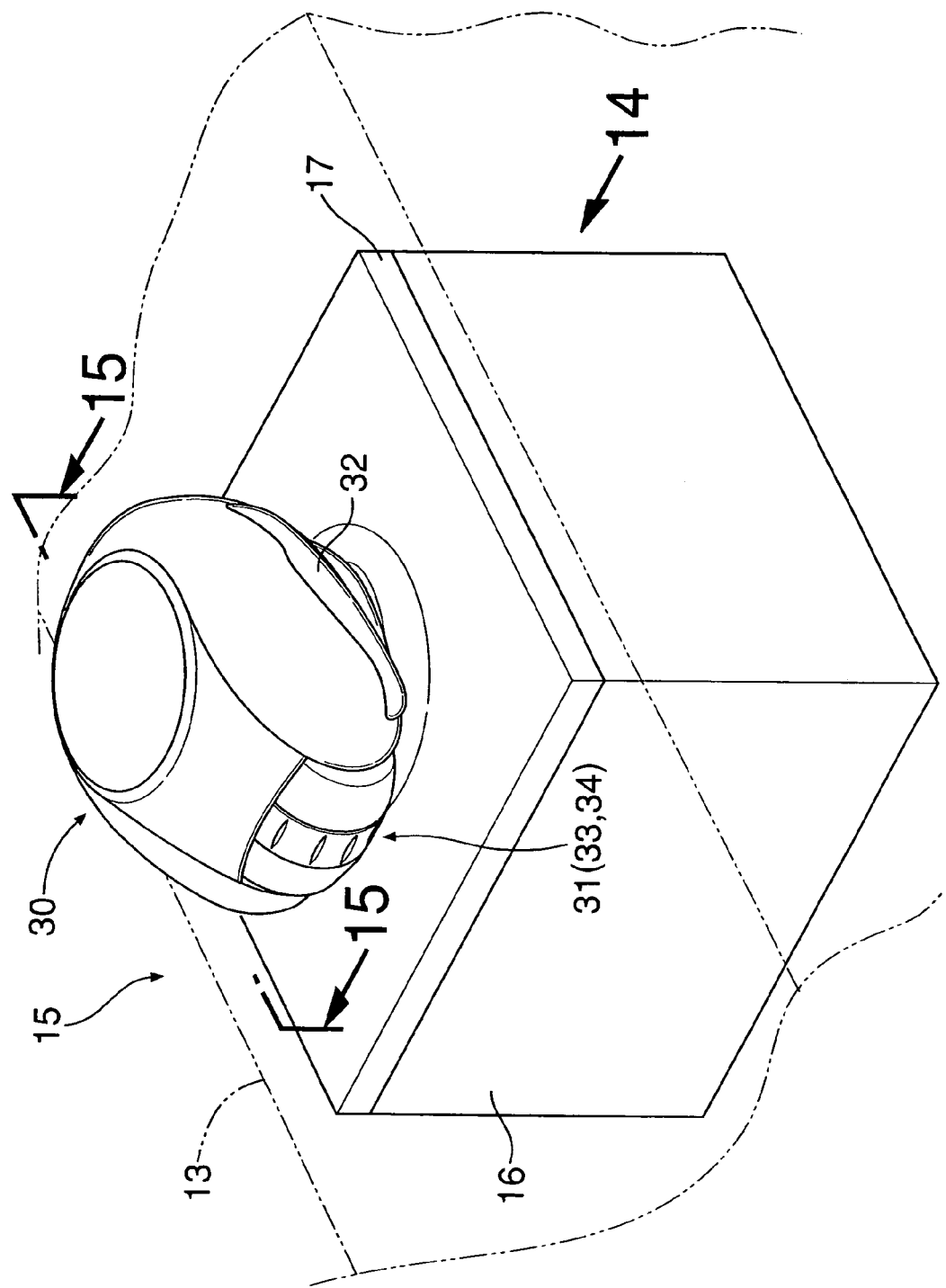
FIG. 13 is a view, corresponding to FIG. 2, of a second embodiment (second embodiment).
Figure 14:
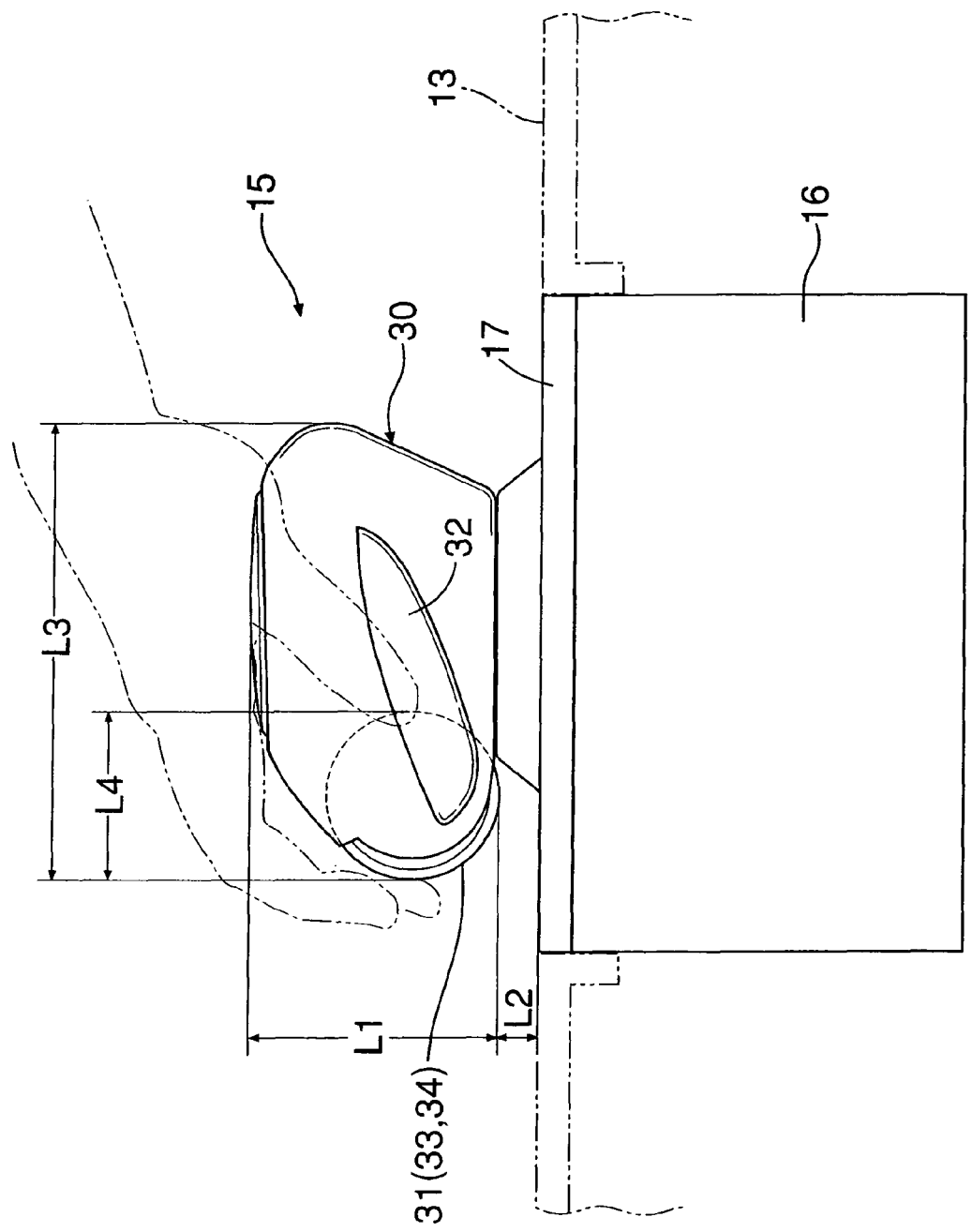
FIG. 14 is a view from the direction of arrow 14 in FIG. 13 (second embodiment).
Figure 15:
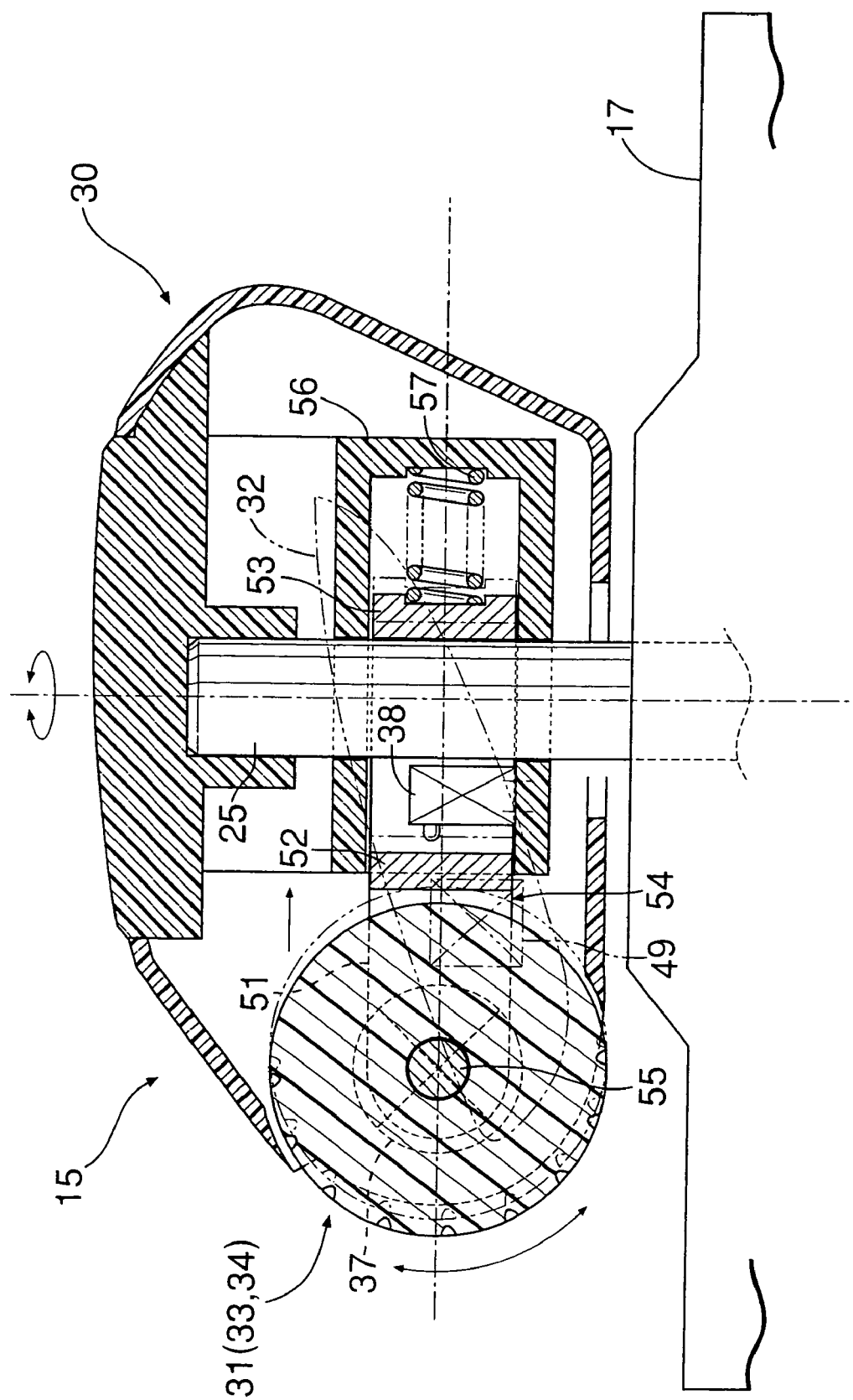
FIG. 15 is a sectional view along line 15-15 in FIG. 13 (second embodiment).
Figure 16:
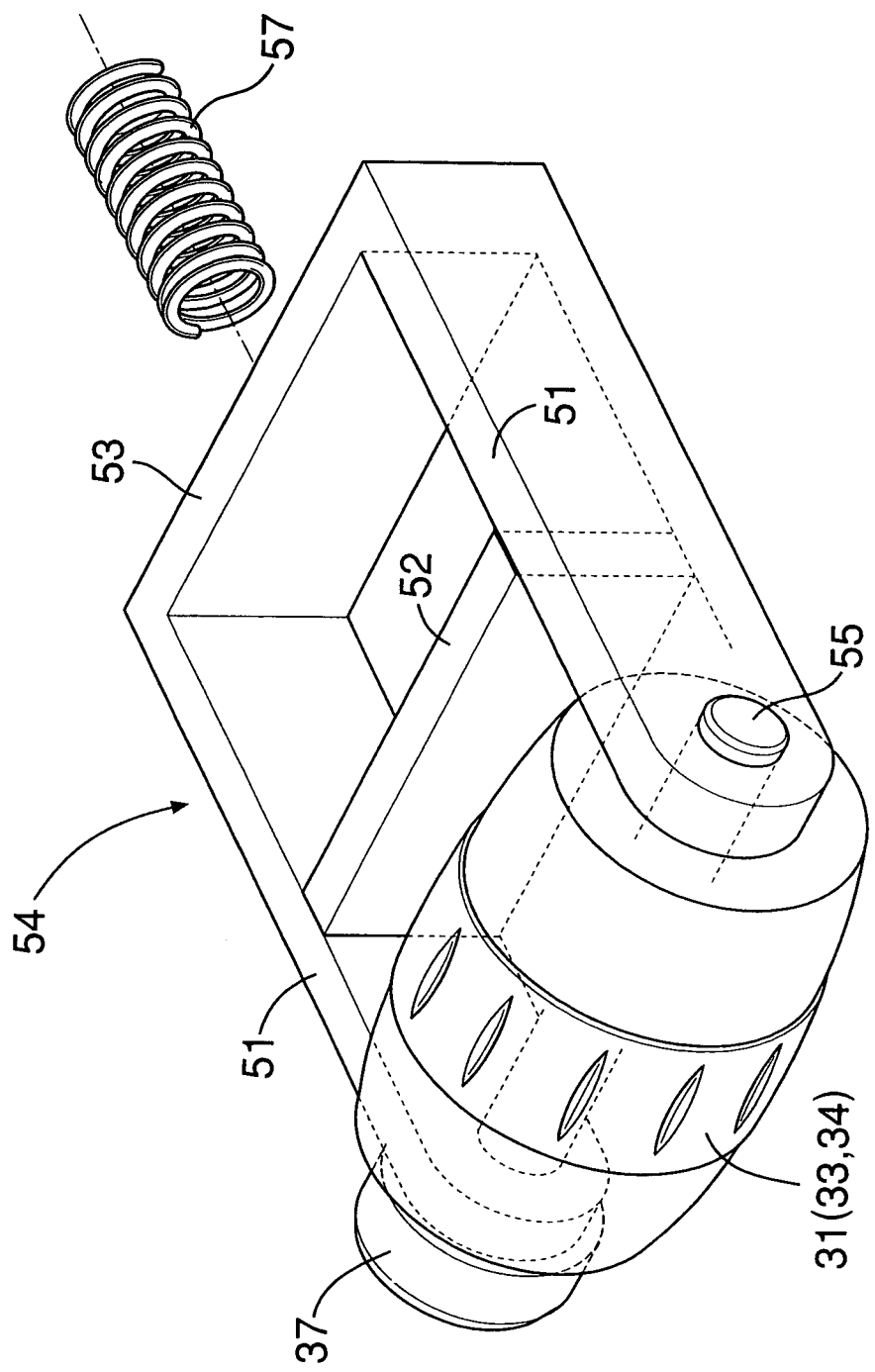
FIG. 16 is a perspective view of a main switch and a sliding member (second embodiment).

To explain in more detail, as shown in FIG. 12, when the main switch 31 (execution switch 34) is pushed down on the initial screen of the monitor, the uppermost level screen (navigation main screen) of the navigation system is displayed, and when the sub switches 32 and 32 are pushed down, uppermost level screen of navigation system→uppermost level screen (audio interrupt screen) of audio system→uppermost level screen (air conditioner interrupt screen) of air conditioning system are displayed in sequence.

Furthermore, when the main switch 31 is pushed down on the uppermost level screen (navigation main screen) of the navigation system, a second level screen (navigation menu screen) of the navigation system is displayed, and when the main switch 31 is pushed down again, a third level screen (navigation sub menu screen) of the navigation system is displayed.

Moreover, when the main switch 31 is pushed down on the uppermost level screen (audio interrupt screen) of the audio system, a second level screen (audio main screen) of the audio system is displayed, and when the main switch 31 is pushed down again, a third level screen (audio sub screen) of the audio system is displayed.

Furthermore, when the main switch 31 is pushed down on the uppermost level screen (air conditioner interrupt screen) of the air conditioning system, a second level screen (air conditioner main screen) of the air conditioning system is displayed, and when the main switch 31 is pushed down again, a third level screen (air conditioner sub screen) of the air conditioning system is displayed.

If, on the other hand, instead of the main switch 31, the sub switches 32 and 32 are pushed down, a lower level screen is switched to an upper level screen each time, and the uppermost level screen is finally returned to. Furthermore, when the sub switches 32 and 32 are pushed down for a longer time (at least 2 sec), the uppermost level screen is returned to directly from a lower level screen. In this way, since two types of function are exhibited depending on the duration for which the sub switches 32 and 32 are pushed down, it is possible to suppress an increase in the number of switches, thus enhancing the operability.

Moreover, by operating the main switch 31 and the sub switches 32 and 32 at the same time, the following various functions may be exhibited without increasing the number of switches unnecessarily.

When pushing down of the main switch 31 (execution switch 34) and pushing down of the sub switches 32 and 32 are carried out at the same time:

Example 1

Single Function Allocation

In each screen operation, a particularly often used function is freely assigned.

In a map screen, a subject vehicle position-up display and a north-up display are switched over.

Example 2

Menu Calling

A menu other than a normal menu is called.

In a map function screen, a freely customizable menu is called.

In an audio screen, a function setting screen is called.

When rotation of the main switch 31 (scroll switch 33) and pushing down of the sub switches 32 and 32 are carried out at the same time:

Example 1

Shortcut Allocation

A specific single function, low in a hierarchy, requiring a selection operation is called directly.

In any screen, a telephone directory (requiring a selection operation) is called directly.

Example 2

Analogue Quantitative Operation

In each screen operation, a particularly often used function is freely assigned.

In a map screen, angle adjustment is carried out, and in an air conditioner screen, air flow adjustment, etc. is carried out.

Furthermore, a tilting operation of the operating knob 30 in the eight directions is utilized for scrolling of the navigation screen in a given direction, changing a source in the audio screen, or switching functions in the air conditioner screen, and a pivoting operation of the operating knob 30 is utilized for sound volume adjustment in the navigation screen or the audio screen, temperature adjustment or air flow adjustment in the air conditioner screen, etc.

Embodiment 2

FIG. 13 to FIG. 16 show a second embodiment of the present invention. In the second embodiment, members corresponding to the members of the first embodiment are denoted by the same reference numerals and symbols as those of the first embodiment, and duplication of the explanation is thus avoided.

The operating knob 30 of the first embodiment is substantially spherical, but an operating knob 30 of the second embodiment has a vertically flattened shape. The dimension of the operating knob 30 in the fore-and-aft direction is 80 mm as in the first embodiment. When the vertical height of the operating knob 30 is L1, and the height between the lower end of the operating knob 30 and an upper face of a cover 17 is L2, L1>L2 holds. Furthermore, when the fore-and-aft length of the operating knob 30, including a main switch 31, is L3, and the fore-and-aft length of a finger rest portion 30b is L4, the right-hand end part of L4 in FIG. 14 being, for example, although not shown, the branching point of the index finger and the middle finger as a reference point, the relationship L3>2×L4 between L3 and L4 holds. The relationships between these dimensions L1 to L4 are the same as in the first embodiment.

The second embodiment is different from the first embodiment in terms of the shape of the operating knob 30 as well as in terms of the structure of the main switch 31. With regard to the main switch 31 of the first embodiment, the scroll switch 33 rotates in place, and the execution switch 34 is pushed down separately from the scroll switch 33, but with regard to the main switch 31 of the second embodiment, a scroll switch 33 and an execution switch 34 rotate integrally and are pushed down integrally.

That is, the second embodiment includes a sliding member 54 in which a pair of side members 51 and 51 are connected by a front cross member 52 and a rear cross member 53, the main switch 31 is rotatably supported between the side members 51 and 51 at the front end of the sliding member 54 by a support shaft 55, and rotation of the support shaft 55 is detected by a rotary encoder 49. The sliding member 54 is supported so that it can slide in the fore-and-aft direction on a slide guide 56 formed within the operating knob 30, a spring 57 urging the sliding member 54 forward is disposed between the rear cross member 53 of the sliding member 54 and the rear end of the slide guide 56, and a switching element 38 is provided on the slide guide 56 so as to face a rear face of the front cross member 52. Other than the above, the structure of the second embodiment is the same as that of the first embodiment.

When the main switch 31 is rotated, its rotational angle is detected by the rotary encoder 49; pushing down the main switch 31 moves the sliding member 54 back along the slide guide 56, the front cross member 52 pushes the switching element 38, and the pushing down of the main switch 31 is detected.

In accordance with this second embodiment, the same effects as those of the first embodiment described above can be attained.

Embodiments of the present invention are explained above, but the present invention may be modified in a variety of ways as long as the modifications do not depart from the spirit and scope of the present invention.

For example, in the embodiments the dimension of the operating knob 30 in the fore-and-aft direction is 80 mm, but good operability can be obtained as long as it is in the range of 75 mm to 85 mm.

The invention claimed is:

1. An interface device in which an operating knob for outputting an operation command signal to in-vehicle equipment installed in a vehicle is supported on an operating knob support portion, and a cover is provided between the operating knob and the operating knob support portion, wherein the operating knob has a palm rest portion for an occupant's palm to be placed on, and a switch for outputting the operation command signal to the in-vehicle equipment is disposed on the operating knob within a region that a fingertip can reach while the palm is placed on the palm rest portion, and wherein a gap into which a fingertip can go when the operating knob tilts is formed between the operating knob and a deepest part of a recess formed in the cover.

2. The interface device according to claim 1, wherein the operating knob has a fore-and-aft length in the range of 75 mm to 85 mm.

3. The interface device according to claim 1, wherein tilting the operating knob in fore-and-aft and left-and-right directions outputs the operation command signal to the in-vehicle equipment.

4. The interface device according to claim 1, wherein the recess is an annular recess.

5. An interface device in which an operating knob for outputting an operation command signal to in-vehicle equipment installed in a vehicle is supported on an operating knob support portion, and a cover is provided between the operating knob and the operating knob support portion, wherein when a height of the operating knob is L1 and a gap between the lower end of the operating knob and a deepest part of a concave recess formed in the cover is L2, L1>L2 holds, the operating knob comprises a finger rest portion, forward of a rear side palm rest portion, for an occupant to put a finger on, and when the fore-and-aft length of the palm rest portion is L3, and the diameter of a scroll switch provided on the operating knob, said diameter corresponding to the fore-and-aft length of the finger rest portion, is L4, L3>2×L4 holds.

6. An interface device in which an operating knob for outputting an operation command signal to a navigation system installed in a vehicle is supported on an operating knob support portion, and a cover is provided between the operating knob and the operating knob support portion, wherein tilting the operating knob in fore-and-aft and left-and-right directions outputs the operation command signal to the navigation system and operation of a switch provided integrally with the operating knob outputs the operation command signal to the navigation system, and a map image of the navigation system is moved in the fore-and-aft and the left-and-right directions by the operation command signal due to tilting of the operating knob, and wherein a gap into which a fingertip can go when the operating knob tilts is formed between the operating knob and a deepest part of a recess formed in the cover.

7. The interface device according to claim 6, wherein the switch is disposed within a region that a fingertip can reach while a palm is placed on the operating knob.

8. The interface device according to claim 6, wherein the recess is an annular recess.

9. An interface device in which an operating knob for outputting an operation command signal to in-vehicle equipment installed in a vehicle is supported on an operating knob support portion, and a cover is provided between the operating knob and the operating knob support portion, wherein the operating knob has a palm rest portion for an occupant's palm to be placed on and an integral rotary shaft extending downwardly, the rotary shaft being carried on a base plate in a manner tiltable in fore-and-aft and left-and-right directions including slant directions via a first member that is supported on the base plate swingably around one axis extending in a horizontal direction, and via a second member that is supported on the base plate swingably around another axis extending in a horizontal direction and perpendicular to said one axis, and a switch for outputting the operation command signal to the in-vehicle equipment is disposed on the operating knob within a region that a fingertip can reach while the palm is placed on the palm rest portion, wherein a gap into which a fingertip can go when the operating knob tilts is formed between the operating knob and a deepest part of a recess formed in the cover.

10. The interface device according to claim 9, wherein tilting the operating knob in the fore-and-aft and the left-and-right directions outputs the operation command signal to the in-vehicle equipment.

11. The interface device according to claim 10, wherein the operating knob has a fore-and-aft length in the range of 75 mm to 85 mm.

12. The interface device according to claim 9, wherein the operating knob has a fore-and-aft length in the range of 75 mm to 85 mm.

13. The interface device according to claim 9, wherein the in-vehicle equipment is a navigation system, tilting the operating knob in the fore-and-aft and the left-and-right directions outputs the operation command signal to the navigation system and operation of the switch outputs the operation command signal to the navigation system, and a map image of the navigation system is moved in the fore-and-aft and the left-and-right directions by the operation command signal due to tilting of the operating knob.

14. The interface device according to claim 13, wherein the switch is disposed within a region that the fingertip can reach while the palm is placed on the operating knob.

15. The interface device according to claim 9, wherein the switch outputs the command signal selecting one in-vehicle equipment to be operated among a plurality of in-vehicle equipments.

16. An interface device in which an operating knob for outputting an operation command signal to in-vehicle equipment installed in a vehicle is supported on an operating knob support portion, and a cover is provided between the operating knob and the operating knob support portion, wherein when a height of the operating knob is L1 and a gap between the lower end of the operating knob and a deepest part of a concave recess formed in the cover is L2, L1>L2 holds, the operating knob comprises a finger rest portion, forward of a rear side palm rest portion, for an occupant to put a finger on, and when the fore-and-aft length of the palm rest portion is L3, and the diameter of a scroll switch provided on the operating knob, said diameter corresponding to the fore-and-aft length of the finger rest portion, is L4, L3>2×L4 holds, and a spacing is formed between the operating knob and recess formed in the cover so as to permit a fingertip to be inserted therebetween when the operating knob tilts.

17. The interface device according to claim 16, wherein the switch outputs the command signal selecting one in-vehicle equipment to be operated among a plurality of in-vehicle equipments.

* * * * *